UNITED STATES PATENT OFFICE 2,065,247

PIPE THREAD LUBRICANT

Herschel G. Smith, Swarthmore, Pa., assignor, by mesne assignments, to Gulf Oil Corporation, Pittsburgh, Pa., a corporation of Pennsylvania No Drawing. Application March 14, 1934, Serial No. 715,551

15 Claims. (Cl. 87—9)

This invention relates to pipe thread lubricants and it comprises a composition of matter useful for application to pipe threads and the like to prevent seizing, galling and stripping, the said composition comprising a lubricating base, such as petrolatum or a metallic soap grease, a lubricating metallic powder, such as powdered zinc, and a constituent imparting extreme pressure characteristics, which is usually a chlorinated hydrocarbon or a sulfur-carrying constituent, such as sulfur itself or a sulfurized oil; all as more fully hereinafter set forth and as claimed.

In the construction of pipe lines, in the oil and natural gas industries for example, a large number of relatively difficult problems have been encountered. One such problem which has caused considerable difficulty is encountered especially in the uncoupling of large sized threaded pipe joints. Such joints, after having been united for a short time, tend to "freeze" or grip tightly, the threads seize and stripping usually results. It has been recognized for some time that a special type of lubricant is required for such threaded joints and a considerable number have been proposed in the art.

Most of the pipe thread lubricants heretofore proposed have included one or more powdered solids dispersed in various types of lubricating bases. These prior lubricants have not, however, solved the difficulties involved. Pipe joints made up with these lubricants after a time have a distinct tendency to freeze. They usually have to be hammered prior to uncoupling. At times stripping is caused. Upon examination of the threads after separation of the joint, it is seen that there is an accumulation of the powdered solid at the base of the threads. The surfaces of the threads have a bright metallic appearance showing that these portions have not been satisfactorily lubricated and that there has been a gripping action between the two metal surfaces.

I have discovered that the freezing of pipe thread joints can be substantially completely avoided by introducing, into a pipe thread lubricant containing a grease or petrolatum base and a lubricating metallic powder, a component capable of imparting extreme pressure lubricating characteristics or high load carrying properties; this component usually comprising a chlorinated hydrocarbon or a constituent containing sulfur, such as sulfur itself or a sulfurized oil.

When an ingredient imparting extreme pressure characteristics is added to a lubricant containing a lubricating metallic powder and a grease or petrolatum base, in accordance with my invention, there appears to be a distinct co-operation between the various constituents. Threaded joints made up with such a lubricant show almost no tendency to freeze. There is but small tendency for the lubricant to squeeze out under pressure. The joints separate with a smooth and even tightness. Upon examination of a separated joint it is found that the lubricant is spread evenly, without appreciable accumulation at the base of the threads. Moreover the surfaces of the threads present a dull appearance indicating that these surfaces have been covered with lubricant and have not been in metallic contact with the adjoining surfaces of the threads of the other fitting. A microscopic examination of these surfaces shows that all constituents of the lubricant are present to some extent in a film coating which covers the surfaces of the threads. There is apparently no appreciable segregation of the constituents of my lubricant in this film.

I have tested a large number of materials possessing extreme pressure characteristics and have found that all are advantageous constituents of pipe thread lubricants. These materials include sulfur, the halogens, sulfur-oxygen and sulfur-chlorine compounds, sulfurized oils, such as sulfurized sperm oil, various halogenated hydrocarbons such as chlorinated oils and waxes, hexachlorethane, chlorinated naphthalene, lard oil treated with sulphur chloride, etc. All chlorinated hydrocarbons characterized by low volatility appear to be useful in my invention. Finely ground sulfur is one of the best materials which I have tested.

Of the lubricating metallic powders useful in my composition, zinc and aluminum appear to be the best. Graphite is sometimes useful in these compositions in addition to a powdered metal.

In my pipe thread lubricant it is sometimes advantageous to add a hygroscopic agent, such as glycerine or glycol, in order to prevent drying or caking.

While metal soap greases, such as the lubricating greases used in grease cups and the like, are most advantageous in my composition, this lubricating base may be replaced by petrolatum, for example. I usually employ an alkaline earth soap grease but other metal soap greases, such as aluminum, are also useful.

A viscosity reducing oil is also added to my composition in the proportion required to produce the desired consistency. I usually use a light paraffin oil for this purpose.

In a specific embodiment of my invention, I prepared a tallow oil soap by saponifying tallow oil with the required amount of milk of lime, this saponification being conducted under steam pressure and in the presence of a small proportion of pale paraffin oil. Upon release of the steam pressure an additional quantity of the paraffin oil was worked into the grease and finally zinc dust, powdered sulfur and graphite were intermixed while the composition was still hot. A final adjustment of the consistency was made by adding a further amount of paraffin oil and the grease was finally drawn off and packaged.

In the following table three typical formulae are given within the purview of my invention. These were compounded by the method indicated above.

| Make-up in percent by weight | Grease A | Grease B | Grease C |
| --- | --- | --- | --- |
| 150 vis. (100° F.) Paraffin oil | 62.2 | 60.0 | 60 |
| Calcium tallow oil soap | 13.7 | 13.0 | 14 |
| Zinc dust | 20 | 20 | 20 |
| Powdered sulfur | 2 | 0 | 2 |
| Sulfurized sperm oil | 0 | 5 | 0 |
| Colloidal graphite | 0 | 0 | 2 |
| Melting point of finished grease in °F. by Hawxhurst | 177° | 178° | 180° |

Because of the use of tallow in manufacture of the soap, a small amount of glycerine, as well as a trace of water, was present in the product.

It is possible to vary the proportions of the various ingredients employed in my composition to a considerable extent. Those indicated in the above table are merely illustrative. For example the metal powder in the composition may range from about 10 per cent to 50 per cent by weight. The proportion of thinning oil may vary according to the consistency desired in the finished product. The sulfur-carrying ingredient may vary from as low as 1 per cent in the case of sulfur, up to about 20 per cent in the case of sulfurized sperm oil, while the graphite may be used in proportions up to 25 per cent, or higher. As stated above many of these constituents may be replaced by equivalent materials performing the same function.

I usually prefer to make up my lubricant in paste form to about the consistency of a lubricating grease of medium or soft type. It is possible of course to dissolve my composition in a volatile solvent or to melt the same for convenience in application. When applied in this form the composition should be well stirred to keep the solid materials in suspension.

When I use the term "lubricating metallic powder", I mean thereby a metallic powder which functions as a lubricant when used as herein described.

In my copending application Serial No. 60,356 filed as a continuation in part of the present application, I describe and claim improved pipe thread lubricants wherein sulfurized fatty esters, particularly sulfurized sperm oil, are employed as the ingredient imparting extreme pressure characteristics to said lubricants.

What I claim is:—

1. As an improved lubricating grease, suitable for lubricating threaded pipe joints and the like and for making tight, non-freezing joints, a pipe thread lubricant comprising a major amount of a metal soap grease as the lubricating base and minor amounts of a lubricating metallic powder and a sulfur-containing ingredient imparting extreme pressure characteristics to said composition.

2. The lubricant of claim 1 wherein the metallic powder is zinc powder.

3. The lubricant of claim 1 wherein a small amount of a hygroscopic agent is present.

4. A pipe-thread lubricant comprising a major amount of an alkaline earth metal soap grease as the lubricating base, and minor amounts of a lubricating metallic powder and a sulfur-containing ingredient imparting extreme pressure characteristics selected from a class consisting of sulfur itself and sulfurized oils.

5. The lubricant of claim 4 wherein the sulfur-containing ingredient is sulfur.

6. The lubricant of claim 4 wherein a small amount of a hygroscopic agent is present.

7. A pipe-thread lubricant comprising a calcium soap grease as the lubricating base, and minor amounts of a lubricating metallic powder, graphite and a component containing sulfur and capable of imparting extreme pressure lubricating characteristics to said lubricant.

8. A pipe thread lubricant capable of making tight, non-freezing joints, said lubricant comprising a grease base of petroleum oil and metal soap, a lubricating metallic powder and a constituent imparting extreme pressure characteristics containing sulfur.

9. A pipe-thread lubricant comprising amorphous graphite, sulfur, zinc dust and calcium tallow oil soap grease.

10. A pipe-thread lubricant comprising amorphous graphite, sulfur, zinc dust and a metal soap grease base.

11. A pipe-thread lubricant comprising calcium tallow oil soap grease, a thinning oil, amorphous graphite and a sulfur-containing constituent imparting extreme pressure characteristics.

12. A pipe thread lubricant capable of making tight, non-freezing joints, said lubricant comprising a grease base of petroleum oil and metal soap, a lubricating metallic powder, a sulfur-containing constituent imparting extreme pressure characteristics and a hygroscopic agent.

13. A pipe-thread lubricant comprising a metal soap grease base, zinc dust, powdered sulfur and a hygroscopic agent.

14. A pipe-thread lubricant comprising a calcium tallow oil soap grease base, zinc dust, powdered sulfur, colloidal graphite and a small amount of glycerine.

15. A pipe-thread lubricant comprising a calcium tallow oil soap reduced in viscosity by containing paraffin oil, about 20 per cent zinc dust, about 2 per cent sulfur, about 2 per cent colloidal graphite and about 1 per cent glycerine.

HERSCHEL G. SMITH.